United States Patent
Chmielewski et al.

[11] Patent Number: 5,659,494
[45] Date of Patent: Aug. 19, 1997

[54] METHOD AND APPARATUS FOR DETERMINATION OF AN APPROXIMATE STANDARD DEVIATION IN AN IMAGE PROCESSOR

[75] Inventors: Ingo Chmielewski, Braunschweig; Detlef Räth, Hohenhameln, both of Germany

[73] Assignee: Matsushita Electric Industrial Co., Ltd., Osaka-fu, Japan

[21] Appl. No.: 385,990

[22] Filed: Feb. 9, 1995

[30] Foreign Application Priority Data

Feb. 10, 1994 [DE] Germany .................... 44 04 215.9

[51] Int. Cl.⁶ .................................................. G06F 7/00
[52] U.S. Cl. ............................................. 364/715.012
[58] Field of Search ................... 364/715.01, 724.01, 364/718, 722, 724.03, 728.03, 728.05, 728.07, 735, 752

[56] References Cited

U.S. PATENT DOCUMENTS

| | | | |
|---|---|---|---|
| 4,677,993 | 7/1987 | Kato et al. | 131/280 |
| 4,758,968 | 7/1988 | Lord | 364/552 |
| 5,448,304 | 9/1995 | Chmielewski et al. | 348/619 |
| 5,504,318 | 4/1996 | Joseph et al. | 235/462 |

*Primary Examiner*—Reba I. Elmore
*Assistant Examiner*—Chuong D. Ngo
*Attorney, Agent, or Firm*—Whitham, Curtis, Whitham & McGinn

[57] ABSTRACT

An economical and less cumbersome method for the determination of an approximate standard deviation is implemented in hardware that does not require multipliers and root calculators. A mean value for a series of values is first calculated. Then, for each of the values in the series, the difference between the value and the mean value is calculated. Each of the differences is then classified in at least two different groups, with the classification corresponding to the size of the difference. The differences are then weighted according to the group in which they are classified. Finally, the weighted differences are summed and divided by an appropriate predetermined number. This method can be used in systems for noise suppression with a sigma filter.

11 Claims, 2 Drawing Sheets

METHOD AND APPARATUS FOR DETERMINATION OF AN APPROXIMATE STANDARD DEVIATION IN AN IMAGE PROCESSOR

BACKGROUND OF THE INVENTION

1. Field of the Invention

The present invention generally relates to digital signal processing of the type carried out in an image processor and, more particularly, to a method and apparatus for determination of an approximate standard deviation with computational steps that are easily implementable in simplified hardware.

2. Description of the Prior Art

Particularly in the area of image processing, and predominantly for the purpose of noise suppression, the use of "sigma filters" is known. The function of sigma filters is based on replacing a signal value of a pixel belonging to a video image by a determined signal value that is formed by averaging with adjacent signal values, whose intensity lies within a fixed standard deviation range (sigma range) around the intensity value of the output signal value. The basic idea of this filtration consists in the fact that noise disturbances occur with a Gaussian distribution, so that effective noise suppression is possible within the standard deviation range. If a greater intensity difference of an adjacent signal value from the output signal value exists, there is a high probability that this difference in intensity is not caused by noise but by a different image signal content. This signal value should therefore not be included in averaging.

A modified sigma filter is described in prior German Patent Application P 43 14 980.4. An improvement in noise suppression is achieved by virtue of the fact that depending on the respective standard deviation (sigma), limiting values are established within which signal values for averaging are used. Above a certain standard deviation, a constant limiting value is used. This results in a quality improvement in a video image to be reproduced, wherein unnatural image impressions with plastic effects are avoided.

Standard deviation is defined as follows:

$$\sigma = \sqrt{\frac{1}{N} \sum_{i=1}^{N} [P(i) - \overline{P}]^2} \quad ,$$

where $$\overline{P} = \frac{1}{N} \sum_{i=1}^{N} P(i).$$

Here N is the number of pixels over which the averaging is conducted.

Calculation of the standard deviation requires a number of computational steps performed in a processor, preferably in a hardware circuit. Implementation in a hardware circuit requires a relatively large chip area and is therefore costly. During the performance of the computational operations in a processor, considerable computation time is required, which in many cases rules out real-time applications.

SUMMARY OF THE INVENTION

It is therefore an object of the present invention to structure the determination of the standard deviation, in any case in an approximate manner, in such manner that it can be done at less cost in hardware and computation time.

According to the present invention, a method of determining the standard deviation is provided in which a mean value for a series of values is first calculated. Then, for each of the values in the series, the difference between the value and the mean value is calculated. Each of the differences is then classified in at least two different groups, with the classification corresponding to the size of the difference. The differences are then weighted according to the group in which they are classified. Finally, the weighted differences are summed and divided by an appropriate predetermined number. This method can be used in systems for noise suppression with a sigma filter.

The method according to the invention surprisingly permits an approximation, which is sufficiently good in practice, of the exact value of the standard deviation through computational operations that can be implemented exclusively with adders, shift registers, and comparators readily and compactly even in hardware. Multipliers and root calculators used previously that require a considerable chip area in hardware implementation can be omitted.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
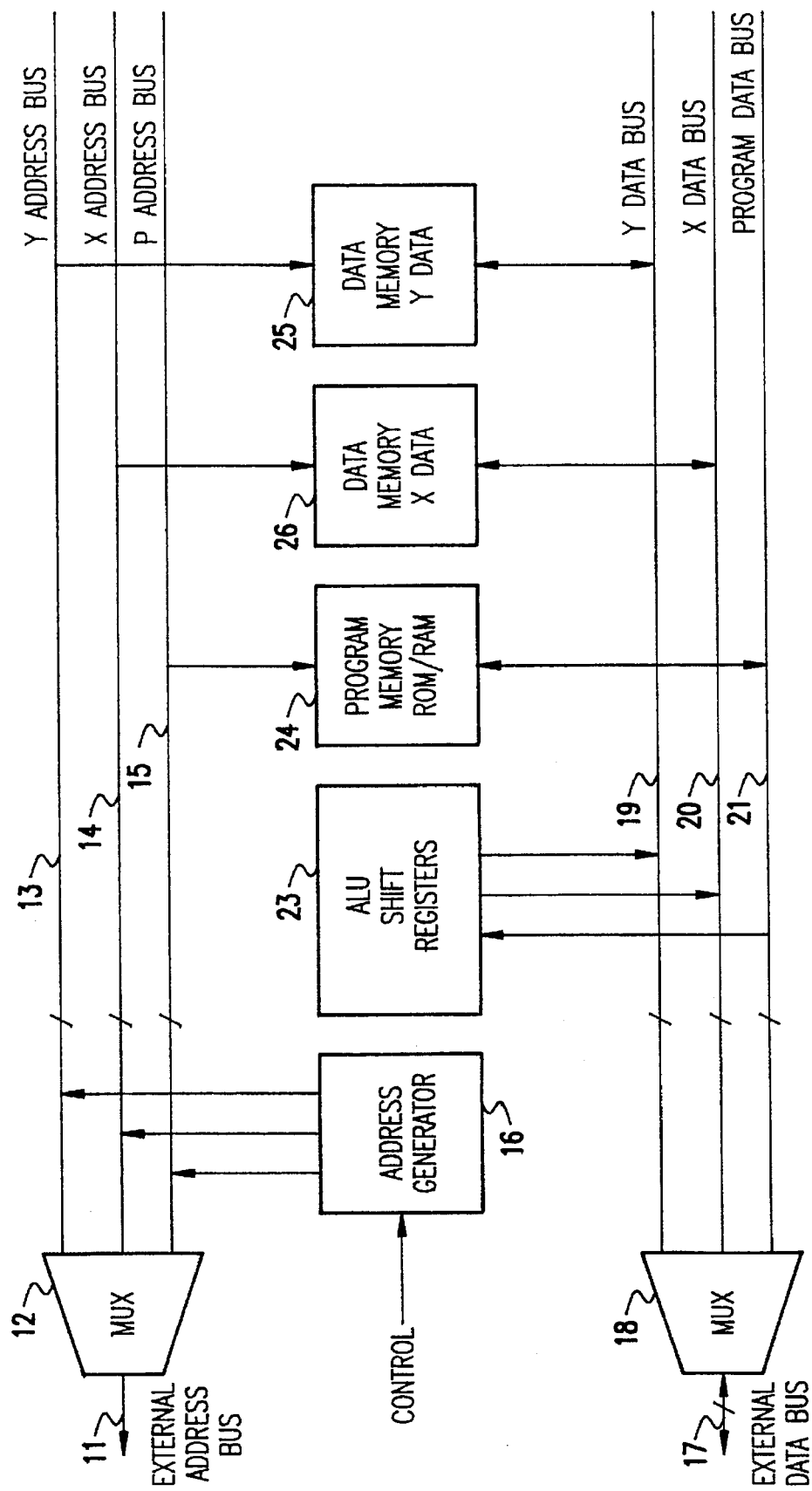
FIG. 1 is a block diagram of a digital signal processor of the type on which the invention may be implemented.
Figure 2:
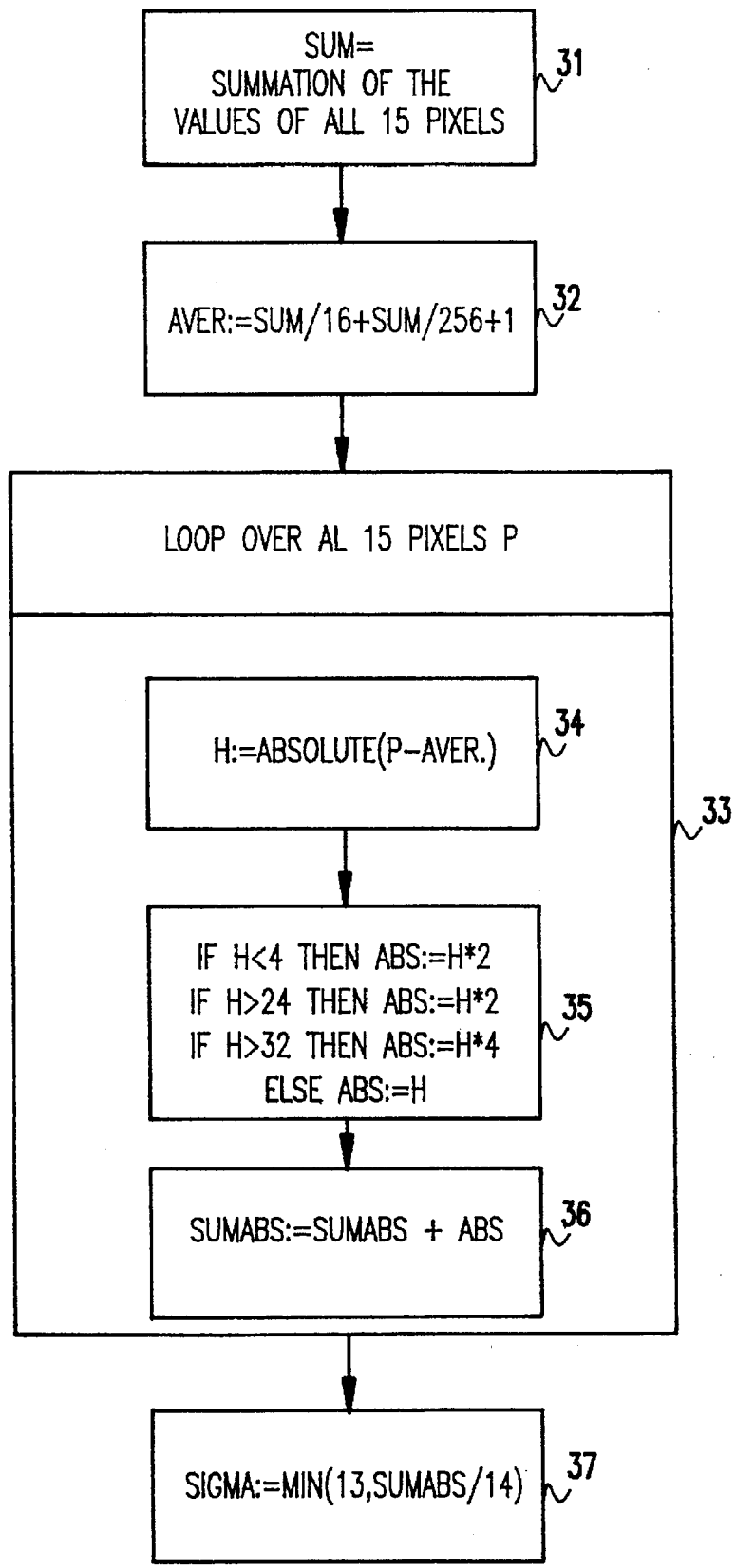
FIG. 2 is a flow diagram of the logic of the program for determining the standard deviation according to the present invention and which may be implemented on the signal processor of FIG. 1.

Referring now to the drawings, and more particularly to FIG. 1, there is shown a block diagram of a simplified digital signal processor (DSP) on which the invention may be implemented. An external address bus 11 is connected to an address multiplexer (MUX) 12 which selects from three address buses; a Y address bus 13, an X address bus 14 and a P or program address bus 15. The addresses on each of these address buses are generated by an address generator 16 in response to an external control signal. An external data bus 17 is connected to a data multiplexer (MUX) 18 which selects from three data buses; a Y data bus 19, an X data bus 20 and a program data bus 21. An arithmetic logic unit (ALU) and shift registers 23 operates on data on the Y and X data buses under control of the program stored in program memory 24. The program stored in program memory 24 according to a preferred embodiment of the invention is illustrated in FIG. 2 described below. The program memory 24 may be read only memory (ROM) or random access memory (RAM) or a combination of both. Where RAM is used, the program data bus 21 allows the program in program memory 24 to be modified, updated or otherwise changed under control of addresses on P address bus 15. If only ROM is used for the program memory 24, the program data bus 21 is not required. The data on the Y data bus 19 is read out of data memory 25 under control of addresses on Y address bus 13, and results output from ALU 23 of operations on data from the Y data bus 19 are stored in data memory 25. Likewise, the data on the X data bus 20 is read out of data memory 26 under control of addresses on X address bus 14, and results output from ALU 23 of operations on data from the X data bus 20 are stored in data memory 26. The contents of data memories 25 and 26 may be read out to the external data bus 17 via multiplexer 18 under control of the address generator 16.

As will become more apparent from the following description, the ALU 23 may be considerably simplified in comparison with other prior art DSPs since multipliers and root calculators are not required, all divisions being approximately performed by shift registers. Furthermore, only simple comparisons and summations are required to implement the invention in addition to the approximate divisions performed by shift registers. In addition, this DSP may be simplified further by removing the data memories 25 and 26 from the chip and replacing them with smaller cache memories.

In one preferred embodiment of the method according to the invention, at least three groups are used for classification of differences, whereby a minimum weighting factor is used for the average group. It is possible in simple fashion to use weighting factor 1 for the average group and weighting factor 2 for the adjacent groups. A further refinement is accomplished by using an additional fourth group for large differences and using a maximum weighting factor for this fourth group, and the weighting factor can be 4, as in the example given. For use of the method according to the invention for performing noise suppression in a video signal, especially in the method disclosed in prior patent application P 43 14 980.4, it is advantageous to use a maximum value for the standard deviation determined.

The suitable number used for division is advantageously on the order of magnitude of the number of summed weighted differences. It has been found that the number is advantageously slightly less than the number of weighted differences; it can be smaller by 1, for example. When the method according to the invention is used for averaging values, especially pixel values, and the formation of 15 weighted differences, the sum of the weighted differences is preferably divided by 14.

The process according to the invention will now be described in greater detail with reference to an embodiment illustrated by the flow diagram in FIG. 2. In function block 31, the SUM resulting from the summing of the intensity values of 15 pixels is formed. The intensity values are usually in the form of digital values between 16 (black value) and 255 (brightest white value) (8-bit quantization).

In function block 32, the mean value, Aver, is formed. In theory, averaging is accomplished by dividing SUM by 15. This division is easier to implement in hardware when it is performed as a division by 16 plus division by 256, which involve only simple shifting operations in shift registers. Since in this connection division takes place by something more than 15 (approximately 15.06), the sum 1 thus formed is added.

This is followed by a processing loop 33 for all 15 pixels P. As a helpful variation H, the absolute value of the difference of the respective pixel value P from the mean value Aver is formed in function block 34. The value H is then classified in function block 35. If H<4 or H>24 or H<32, a weighted difference ABS is formed by multiplying H by 2. If H is above 32, the weighting factor 4 is used to form the weighted difference ABS. If 4<H or H>24, weighting factor 1 is used so that ABS=H. The respectively determined value for the weighted difference ABS is summed over all 15 pixels in function block 36.

After processing all 15 pixels, the sum of the weighted differences SUMABS is available. Now SUMABS is divided by 14 in function block 37 as the standard deviation SIGMA. This division is performed for the same reasons as in the averaging for Aver, advantageously approximated by the expression SUMABS/16+SUMABS/128+1, again using shift registers.

In the embodiment shown, a maximum SIGMA value of 13 should be used for noise reduction, so that the approximately determined SIGMA value is only used if it is less than 13.

As is clear from the example, shift registers (for performing divisions), adders and comparators are all that is required for ALU 23 shown in FIG. 1 to obtain a pragmatically useful value of SIGMA for the standard deviation. The number of computational steps decreases with respect to the computational steps for exact determination of standard deviation according to the formula given at the outset by a factor of twenty, whereby the cost for hardware implementation is also reducible by a factor of twenty. The same is true qualitatively for the computational time of a processor.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for determining an approximate standard deviation implemented in a digital signal processor, comprising the steps of:

inputting a series of values;

determining a mean value for said series of values;

calculating an absolute value of the difference of each of said values from said mean value;

classifying said absolute value into at least two different groups, said classifying corresponding to the magnitude of said absolute value;

selecting a weighting factor from a plurality of predetermined weighting factors, said selecting being in accordance with the group into which said classifying step classified said absolute value;

weighting each of said absolute values by the corresponding selected weighting factor and, for each of said absolute values, generating a corresponding weighted absolute value;

summing said weighted absolute values;

approximately dividing said sum of weighted absolute values by a predetermined divisor, said step of approximately dividing comprising a step of shifting said sum of weighted values a predetermined number of bits corresponding to said predetermined divisor to generate a result; and using the result of said approximately dividing as an approximate standard deviation for noise suppression filtering with a sigma filter.

2. A method according to claim 1 wherein at least three groups are used for said classifying and a minimum weighting factor is used for the values which are classified in a middle group.

3. A method according to claim 2 wherein said middle group has a weighting factor of 1 and adjacent groups have a weighting factor of 2.

4. A method according to claim 3 wherein at least four groups are used for said classifying, said fourth group including largest differences, and wherein said fourth group has a maximum weighting factor.

5. A method according to claim 4 wherein said maximum weighting factor is 4.

6. A method according to claim 2 wherein at least four groups are used for said classifying, said fourth group including largest differences, and wherein said fourth group has a maximum weighting factor.

7. A method according to claim 4 wherein said maximum weighting factor is 4.

8. A method according to claim 1 further including the step of determining a maximum value for standard deviation, whereby if the determined approximate standard deviation is greater than said maximum value, said maximum value is provided.

9. A method according to claim 1 wherein said predetermined number is equal to the count of said weighted differences.

10. A method according to claim 9 wherein said predetermined number is equal to the count of said weighted differences minus 1.

11. A method according to claim 10 wherein fifteen values are included in said series of values and said predetermined number is fourteen.

* * * * *